(12) United States Patent
Kim et al.

(10) Patent No.: US 8,644,990 B2
(45) Date of Patent: Feb. 4, 2014

(54) APPARATUS AND METHOD FOR PROVIDING ROBOT INTERACTION SERVICES USING INTERACTIVE BEHAVIOR MODEL

(75) Inventors: Jong-Cheol Kim, Seoul (KR); Hyun-Ho Kim, Seoul (KR); Joo-Won Sung, Seoul (KR); Myoung-Wan Koo, Seoul (KR)

(73) Assignee: KT Corporation, Seongnam (KR)

( * ) Notice: Subject to any disclaimer, the term of this patent is extended or adjusted under 35 U.S.C. 154(b) by 145 days.

(21) Appl. No.: 13/115,559

(22) Filed: May 25, 2011

(65) Prior Publication Data

US 2012/0116584 A1 May 10, 2012

(30) Foreign Application Priority Data

Nov. 4, 2010 (KR) ........................ 10-2010-0109226

(51) Int. Cl.
*G05B 19/042* (2006.01)
(52) U.S. Cl.
USPC ............. 700/246; 901/1; 901/50; 318/568.12
(58) Field of Classification Search
None
See application file for complete search history.

(56) References Cited

U.S. PATENT DOCUMENTS

| | | | | |
|---|---|---|---|---|
| 5,870,527 A * | 2/1999 | Fujikawa et al. | ............. | 700/245 |
| 8,145,492 B2 * | 3/2012 | Fujita | ............................ | 704/270 |
| 2004/0093118 A1 * | 5/2004 | Sabe et al. | ..................... | 700/245 |
| 2006/0041332 A1 * | 2/2006 | Sabe et al. | ..................... | 700/245 |
| 2008/0066065 A1 * | 3/2008 | Kim et al. | ......................... | 718/1 |
| 2008/0097948 A1 * | 4/2008 | Funge et al. | ................... | 706/47 |
| 2008/0313116 A1 * | 12/2008 | Groble | ............................ | 706/45 |
| 2010/0262286 A1 * | 10/2010 | Eidenberger et al. | ......... | 700/246 |

OTHER PUBLICATIONS

Kaelbling, Leslie, Littman, Michael, Reinforcement Learning: a Survey, Journal of Artificial Intelligence Research 4, 1996, p. 237-285.*
Korean Journal of the 2010 Spring Korean Society of Speech Sciences Conference, published May 28, 2010, 3 pages.
Voice 2010 The 4th World Congress, Sep. 9, 2010, 3 pages.
Kim, Jong-Cheol et al., "Interactive Behavior Modeling Based on POMDP for Human-Robot Interaction", May 29, 2010, pp. 191-192.

* cited by examiner

*Primary Examiner* — Khoi Tran
*Assistant Examiner* — Ryan Rink
(74) *Attorney, Agent, or Firm* — Sughrue Mion, PLLC

(57) ABSTRACT

An apparatus for providing robot interaction services using an interactive behavior model for interaction between a user and a robot includes: a control module having a behavior model engine for receiving an observation signal from the outside and determining and outputting an interactive behavior signal based on previously stored behavior and policy models; a robot application module for executing a robot application service and applying the behavior signal to provide the service; a robot function operating module having sensors for observing an external circumstance and a function operating means for performing behavior or function of the robot; and a middleware module for extracting external circumstance observation information and service history information and inputting the information to the control module as the observation signal, and for analyzing the behavior signal to generate and provide motion and function operating signals to the robot function operating module.

11 Claims, 9 Drawing Sheets

FIG. 4

|  | Parameter name | Description | Value |
|---|---|---|---|
| Observation parameter | Heat | Heat sensing | on/off |
| | Touch | Touch sensing | on/off |
| | Tilt | Tilt sensing | on/off |
| | Bottom | Bottom sensing | on/off |
| | Sound | Sound sensing | on/off |
| | Service | Service use | null/yes/no/short/long |
| | Shist | Service use history | low/high |
| | Scharge | Charged state sensing | on/off |
| | Gbattery | Battery capacity sensing | low/high |
| | Etime | Input event time interval sensing | low/high |

FIG. 5

| | Description | Parameter name |
|---|---|---|
| Behavior parameter output | Pat_low | Patted_l |
| | Pat_high | Patted_h |
| | Pleased_low | Pleased_l |
| | Pleased_high1 | Pleased_h1 |
| | Pleased_high2 | Pleased_h2 |
| | Pleased_high3 | Pleased_h3 |
| | Recommend_service1 | Recomm1 |
| | Recommend_service2 | Recomm2 |
| | Recommend_service3 | Recomm3 |
| | Agree1 | Agree1 |
| | Agree2 | Agree2 |
| | Agree3 | Agree3 |
| | Sad_1 | Sad1 |
| | Sad_2 | Sad2 |
| | Sad_3 | Sad3 |
| | Displeased_touch_low | Displeased_touch_l |
| | Displeased_touch_high1 | Displeased_touch_h1 |
| | Displeased_touch_high2 | Displeased_touch_h2 |
| | Displeased_touch_high3 | Displeased_touch_h3 |
| | Dislike_touch_low | Dislike_touch_l |
| | Dislike_touch_high1 | Dislike_touch_h1 |
| | Dislike_touch_high2 | Dislike_touch_h2 |
| | Dislike_touch_high3 | Dislike_touch_h3 |
| | Glad_low | Glad_l |
| | Glad_high | Glad_h |
| | Cute_low | Cute_l |
| | Cute_high1 | Cute_h1 |
| | Cute_high2 | Cute_h2 |
| | Cute_high3 | Cute-h3 |
| | Displeased_heat | Displeased_h |
| | Scare_low | Scare_l |
| | Scare_high | Scare_h |
| | Dizzy-dizzy | Dizzy |
| | Elate_low1 | Elate_l1 |
| | Elate_low2 | Elate_l2 |
| | Elate-low3 | Elate-l3 |
| | Displeased_tilt_low | Displeased_tilt_l |
| | Displeased_tilt_high | Displeased_tilt_h |
| | Dislike_tilt_low | Dislike_tilt_l |
| | Dislike_tilt_high1 | Dislike_tilt_h1 |
| | Dislike_tilt_high2 | Dislike_tilt_h2 |
| | Dislike_tilt_high3 | Dislike_tilt_h3 |
| | Surprised_low | Surprised_l |
| | Surprised_high | Surprised_high |
| | Beware_high | Beware_h |
| | Beware_low1 | Beware_l1 |
| | Beware_low2 | Beware_l2 |
| | Beware_low3 | Beware_l3 |
| | Displeased_sound | Displeased_sound |
| | Urge_low1 | Urge_l1 |
| | Urge_low2 | Urge_l2 |
| | Urge_high1 | Urge_h1 |
| | Urge_high2 | Urge_h2 |
| | Quit | Quit |
| | Hungry_low1 | Hungry_l1 |
| | Hungry_low2 | Hungry_l2 |
| | Hungry_high1 | Hungry_h1 |
| | Hungry_high2 | Hungry_h2 |

| Parameter name | Value | Description | Note |
|---|---|---|---|
| user | noexist | User is not close | User parameter |
|  | close | User is close |  |
|  | up | User lifts up the robot |  |
|  | shake | User shakes the robot |  |
|  | pat | User touches the robot |  |
|  | shout | User talks big |  |
|  | accept | User accepts service recommendation |  |
|  | reject | User rejects service recommendation |  |
|  | nointer | No user interaction |  |
|  | charge | User place the robot on a charge cradle |  |
| mong | P11 | Very timid character | Detailed character of Robot |
|  | P22 | A little timid character |  |
|  | P33 | A little charging character |  |
|  | P44 | Very charming character |  |
| hist | low | Small service use history | Service use history |
|  | high | Great service use history |  |
| battery | low | Low battery capacity | Battery capacity |
|  | high | High battery capacity |  |
| time | low | Short user-input time interval | User-input time interval |
|  | High | Long user-input time interval |  |

FIG. 8

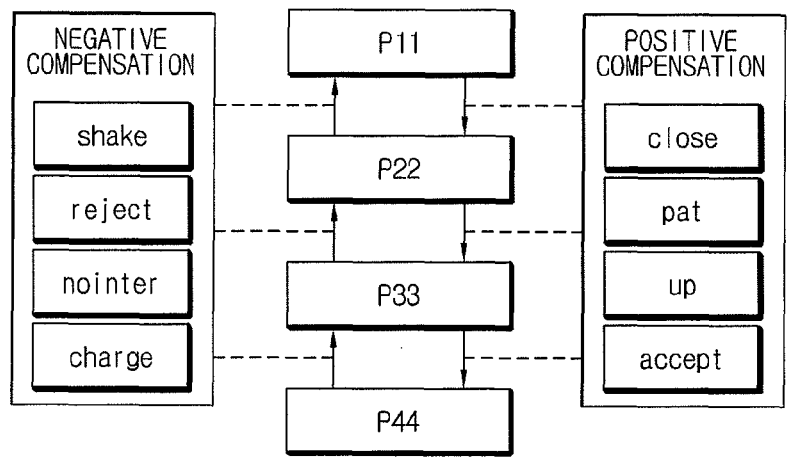

APPARATUS AND METHOD FOR PROVIDING ROBOT INTERACTION SERVICES USING INTERACTIVE BEHAVIOR MODEL

CROSS-REFERENCE TO RELATED APPLICATION

This application claims priority under 35 U.S.C. §119(a) to Korean Patent Application No. 10-2010-0109226 filed at the Korean Intellectual Property Office on Nov. 4, 2010, the entire contents of which are incorporated herein by reference.

FIELD

Exemplary embodiments relate to an interaction service using a robot, and more particularly, to an apparatus and method for providing robot interaction services using an interactive behavior model which allows interaction between users and robots.

DESCRIPTION OF THE RELATED ART

Generally, a service robot refers to a robot interacting with a user by performing tasks instructed by a user. This service robot is connected to a network to provide multimedia services by using voice or images, or the service robot moves or operates to perform a given task. In addition, according to its uses, service robots are classified into robots for manufacturing, robots for special services, robots for personal services and so on.

In the field of service robots, a robot is conventionally designed to be manipulated directly by a user or to perform prearranged behaviors according to a previously input scenario. However, the recent trend focuses on HRI (Human Robot Interaction). Recently, an HRI method using a scenario script are being studied, and an essential point of this method is allowing a user to communicate with a robot as if he/she is talking to the robot, so that the user may feel a sense of friendliness toward the robot like with a pet.

In the existing HRI method, if a specific signal previously defined is input into the robot, the robot would simply match the input signal with the corresponding behavior. However, a method recently presented uses a script based on a scenario between a user and a robot. In this method of using a script, an input of the user is scripted so that the robot may directly recognize the input of the user which allows the robot to more easily and simply express a behavior. In addition, when a specific signal is input into the robot, the robot may not output a given expression according to the specific input signal. In other words, when a specific signal is input into the robot, the robot may output any one of several similar expressions at random or by using probability.

For using this method, input data and output data are mapped in a robot in advance to build a role-based database. The current study focuses on how to output an expression or behavior more easily and accurately using the role-based database.

In the HRI method for allowing a user and a robot to communicate with each other as if they talk, there is a precondition that the robot should recognize for each circumstance, and the robot should be designed to behave in various ways according to the circumstances. The robot recognizes circumstances mostly by using sensors. However, sensors have measurement errors, which may cause the robot to make a strange behavior if a user or circumstance is changed.

Though the existing robot technique pursues interactions between a user and a robot as described above, the robot just repeats simple behaviors since the output of the robot according to a specific input of a user is defined in advance. In other words, in fact, the robot does not communicate with a user but just simply outputs instructed expressions or behaviors.

In addition, if the information input into the robot has a sensor error, an operation error or a circumstance recognition error, the existing robot does not know how to cope with such an error and misjudges the input of the user to output an unexpected behavior, thereby deteriorating the communication between the user and the robot.

SUMMARY

The exemplary embodiments are designed to solve the problems of the prior art, and therefore the exemplary embodiments are directed to providing an apparatus and method for providing robot interaction services using statistical inference which allows a robot to output various behaviors according to inputs of a user or surrounding circumstances.

In addition, an exemplary embodiment is directed to constructing a statistic model which considers errors of data input to a robot so that a robot may actively manage an input error or a circumstance recognition error to flexibly output an appropriate behavior for the circumstance.

Other aspects of the exemplary embodiments will be described later and should be understood by the embodiments. In addition, the aspects of the exemplary embodiments can be implemented using any or more components defined in the appended claims.

In one aspect, the exemplary embodiment provides an apparatus for providing robot interaction services using an interactive behavior model which allows interaction between a user and a robot, which includes: a control module having a behavior model engine for receiving an observation signal from the outside and determining and outputting an interactive behavior signal based on behavior models and policy models, previously stored, according to the input observation signal; a robot application module for executing a robot application service to be provided to the user and applying the behavior signal output from the control module for providing the service; a robot function operating module having a plurality of sensors for observing an external circumstance and a function operating means for performing a behavior or function of the robot; and a middleware module for extracting external circumstance observation information and service history information from the robot function operating module and the robot application module and inputting the external circumstance observation information and the service history information to the control module as the observation signal, and for analyzing the behavior signal output from the control module to generate a motion operating signal and a function operating signal of the robot and providing the generated motion operating signal and the function operating signal to the robot function operating module.

In another aspect, the exemplary embodiment also provides a method for providing robot interaction services using an interactive behavior model for interaction between a user and a robot, which includes (a) executing an application loaded to a robot terminal to provide a robot application service to a user; (b) extracting service history information of a service provided by the application and external circumstance observation information observed by a plurality of sensors by means of a middleware and inputting the service history information and the external circumstance observation information to an interactive behavior model engine; (c) the interactive behavior model engine determining and outputting an interactive behavior signal according to the input information based on behavior models and policy models previously stored; (d) analyzing the output behavior signal by means of the middleware to generate a motion operating signal and a function operating signal of the robot; and (e) performing a behavior or function of the robot by means of a robot function operating means according to the generated motion operating signal and the generated function operating signal.

According to the exemplary embodiment, behavior models and policy models are constructed by an interactive behavior model learning unit using statistical inference so that a robot may perform various interactive behaviors depending on the user or surrounding circumstances. Therefore, even at an unexpected exceptional circumstance or even when an input has an error, the robot may flexibly express an appropriate behavior. In addition, even though behaviors are not previously defined for all circumstances, the robot may perform various interactive behaviors.

Moreover, since a middleware module acts as an intermediary to analyze and convert signals, input to or output from the behavior model engine of the control module which determines a robot behavior signal, it is possible to receive and use a circumstance observation information and a service history information so that a robot may express behaviors and functions in various ways according to the information.

BRIEF DESCRIPTION OF THE DRAWINGS

Other aspects of the exemplary embodiments will become apparent from the following descriptions of the embodiments with reference to the accompanying drawings in which:

FIG. 4 is a table exemplarily showing observation parameters of observation signals input to a control module employed in the apparatus for providing robot interaction services using an interactive behavior model according to an exemplary embodiment;

FIG. 5 is a table exemplarily showing behavior parameters of behavior signals output to the control module employed in the apparatus for providing robot interaction services using an interactive behavior model according to an exemplary embodiment;

FIG. 7 is a table exemplarily showing internal parameters of the interactive behavior model learning unit employed in the apparatus for providing robot interaction services using an interactive behavior model according to an exemplary embodiment;

FIG. 8 is a block diagram for exemplarily illustrating a compensation policy of the interactive behavior model learning unit employed in the apparatus for providing robot interaction services using an interactive behavior model according to an exemplary embodiment;

DESCRIPTION OF THE EXEMPLARY EMBODIMENTS

Hereinafter, exemplary embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein are just examples for the purpose of illustrations only, not intended to limit the scope of the invention, so it should be understood that other equivalents and modifications could be made thereto without departing from the spirit and scope of the invention.

Figure 1:
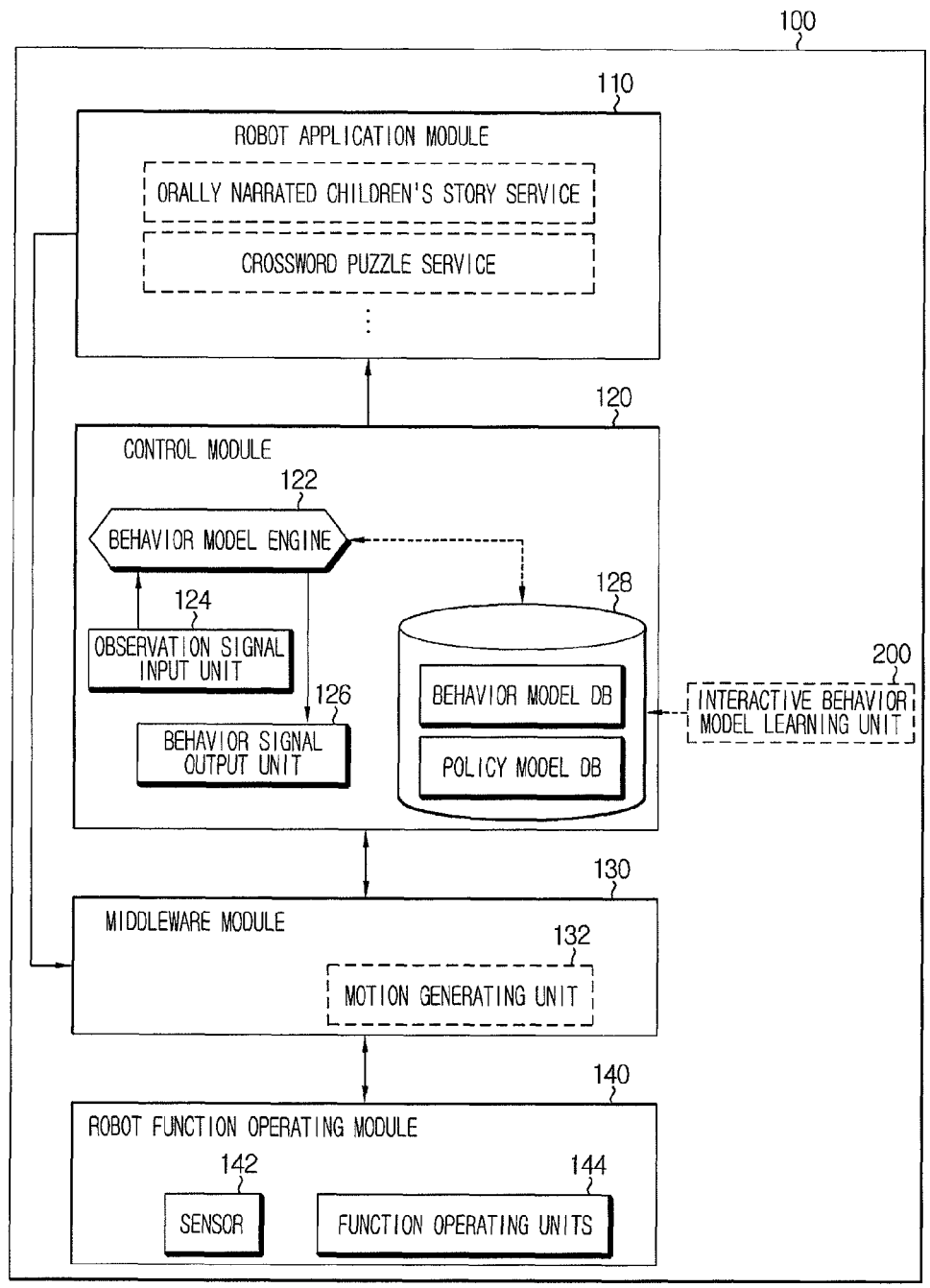
FIG. 1 is a block diagram showing an apparatus for providing robot interaction services using an interactive behavior model according to an exemplary embodiment.

FIG. 1 is a block diagram showing an apparatus for providing robot interaction services using an interactive behavior model according to an exemplary embodiment.

The apparatus for providing robot interaction services according to the exemplary embodiment constructs behavior models and policy models by a learning unit using statistical inference which considers a recognition error of a sensor, so that a robot may perform an expression most similar to a reaction of a user and a given circumstance, e.g., an event, and so that the robot may flexibly perform an expression or behavior even at an exceptional circumstance not previously defined.

Referring to FIG. 1, the apparatus 100 for providing robot interaction services according to the exemplary embodiment includes a robot application module 110 for executing a robot application to be provided to a user, a control module 120 for receiving a signal from the outside and outputting a behavior signal of a robot according to a behavior model engine, a robot function operating module 140 for observing a circumstance by means of sensors and performing a robot behavior by means of a function operating means, a middleware module 130 for converting or generating an input or output signal and an operating signal between the control module 120 and the robot function operating module 140, and an interactive behavior model learning unit 200 for constructing a behavior model which will be used by the control module 120 to determine a behavior of the robot.

The robot application module 110 has a robot application loaded thereto so that the robot is executed to provide a robot application service to a user. The robot application module 110 executes the robot application loaded thereto according to a selection input by a user or according to a behavior signal output from the control module 120. In addition, the robot application module 110 applies the behavior signal output from the control module 120 to provide a robot application service. In this way, the robot application module 110 may provide a more interactive robot application service.

Further, when executing and providing an application service, the robot application module 110 provides service use information and service history information of the application service to the middleware module 130 so that the control module 120 may use the information to determine a robot behavior. For example, the application service provided by the robot application module 110 may be an orally narrated children's story service or a crossword puzzle service.

The control module 120 receives an observation signal from the outside and then determines and outputs an interactive behavior signal of the robot based on behavior models and policy models, which are already stored therein, according to the input observation signal. The control module 120 includes a behavior model engine 122, an observation signal input unit 124, a behavior signal output unit 126, a database (DB) 128 including the behavior model DB and the policy model DB, and so on.

The behavior model engine 122 determines a behavior signal of the robot for the interaction. Here, the behavior model engine 122 uses the input observation signal as an observation parameter and generates a behavior parameter based on behavior models and policy models stored in the DB 128. In an exemplary embodiment, the behavior models may be stored in a behavior model DB and the policy models may be stored in the policy model DB.

The observation signal input unit 124 receives circumstance observation information received from the outside through the middleware module 130 and the service history information provided from the robot application module 110 as an input signal, and then inputs the input signal to the behavior model engine 122 as an observation parameter.

The behavior signal output unit 126 outputs a behavior signal of the robot based on the behavior parameter of the robot generated by the behavior model engine 122. The behavior signal of the robot is transmitted to the middleware module 130.

The DB 128 is information DB constructed and learned according to statistical inference. The behavior model engine 122 uses the DB 128 when determining an interactive behavior of the robot. In addition, the DB 128 is constructed by a learning process using an interactive behavior model learning unit 200, which will be described later.

The robot function operating module 140 observes an external state and circumstance using a plurality of sensors and performs mechanical behavior and function of the robot using a function operating means. The robot function operating module 140 includes sensors 142 and a function operating units 144. The sensors 142 sense states and circumstances around the robot, and the sensors 142 may include thermal sensors, sound sensors, touch sensors, tilt sensors, motion sensors, battery charge sensors, and so on.

The function operating units 144 operates a behavior, motion or function of the robot. The function operating units 144 performs a motion or function of the robot according to a motion operating signal or a function operating signal output from the middleware module 130. The function operating units 144 operates mechanical units of the robot so that the robot moves or makes a certain motion. In addition, the function operating units 144 operates a functioning units of the robot. The functioning units may function to output an effective sound through a speaker, output an image through a display, output a light through LED, or the like. In an exemplary embodiment, the function operating units 144 may be output units.

The middleware module 130 acts as an intermediary between the control module 120 and the robot function operating module 140 by converting or generating signals. In other words, the middleware module 130 extracts the external circumstance observation information and the service history information generated by and provided from the robot function operating module 140 and the robot application module 110 and converts the external circumstance observation information and the service history information into observation parameters which may be input into the observation signal input unit 124 of the control module 120. In addition, the middleware module 130 analyzes the behavior signal and the behavior parameter output from the control module 120 and then generates the behavior signal and the behavior parameter into a motion operating signal and a function operating signal which may be used by the robot function operating module 140 for controlling or operating. In other words, the middleware module 130 generates a motion operating signal and a function operating signal based on the behavior signal and the behavior parameter output from the control module 120.

In addition, the middleware module 130 has a motion generating unit 132. The motion generating unit 132 defines the behavior or function performed according to the behavior signal output from the control module 120, by using a motion operating signal and a function operating signal. In this way, the robot may perform various kinds of motions and functions smoothly according to the behavior signal. In addition, the behavior and function expressed by the robot may be easily changed by just a modification of the motion generating unit 132.

Figure 2:
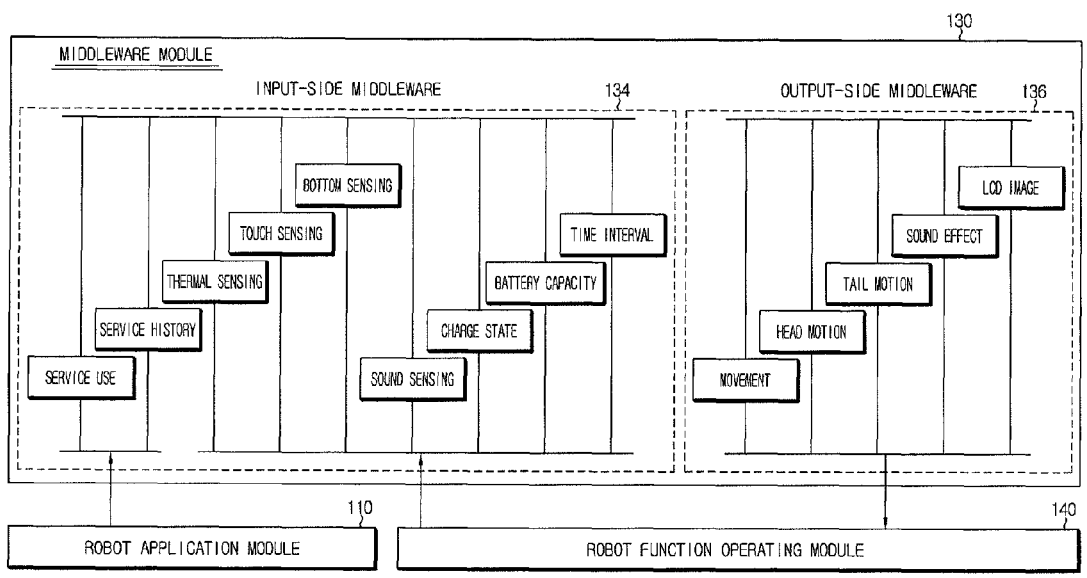
FIG. 2 is a block diagram showing a middleware module of the apparatus for providing robot interaction services using an interactive behavior model according to an exemplary embodiment.

Hereinafter, the middleware module 130 will be described in more detail with reference to other drawings. FIG. 2 is a block diagram showing a middleware module of the apparatus for providing robot interaction services using an interactive behavior model according to an exemplary embodiment.

Referring to FIG. 2, the middleware module 130 of this embodiment includes an input-side middleware 134 and an output-side middleware 136. The input-side middleware 134 extracts or receives various kinds of information from the robot application module 110 and the robot function operating module 140 to generate an observation parameter corresponding to the observation signal input from the control module 120. The middleware module 130 inputs the generated observation parameter to the control module 120.

The input-side middleware 134 receives or extracts the service use information and the service history information from the robot application module 110 and extracts and utilizes various kinds of sensing information, for example thermal sensing information, touch sensing information, bottom sensing information, sound sensing information, charge sensing information, battery capacity sensing information and time interval sensing information from the robot function operating module 140.

The output-side middleware 136 converts the behavior parameter, which is a behavior signal of the robot output from the control module 120, into various motion operating signals and function operating signals by means of the motion generating unit 132 and then transmits the motion operating signals and the function operating signals to the robot function operating module 140. The motion operating signal and the function operating signal generated or converted by the output-side middleware 136 and transmitted to the robot function operating module 140 may be movement, heat motion, tail motion, sound effect, LCD image signal, and so on.

Referring to FIG. 1 again, the interactive behavior model learning unit 200 constructs the DB 128 of the control module 120 by a learning process using statistical inference. The learning process using a statistic inference method improves the ability to cope with uncertainty which is frequent in real life by using Partial Observable Markov Decision Process (POMDP).

The interactive behavior model learning unit 200 above will be described later with reference to other drawings.

Figure 3:
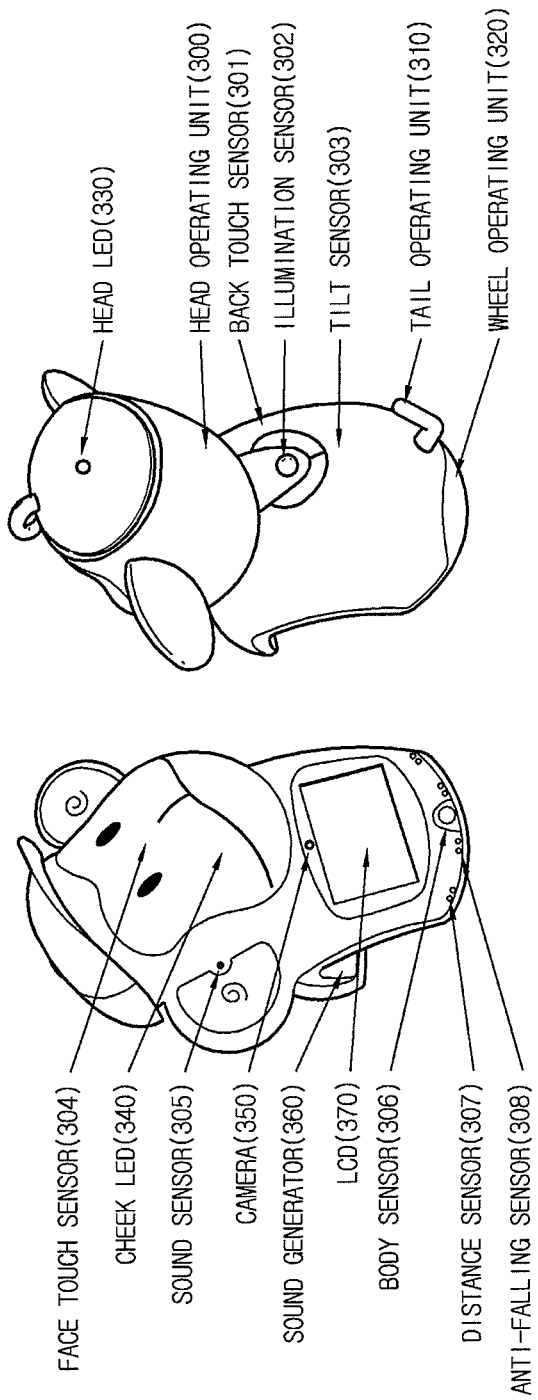
FIG. 3 has pictures showing an appearance of the apparatus for providing robot interaction services using an interactive behavior model according to an exemplary embodiment, and also showing sensors and function operating units thereof.

FIG. 3 has pictures showing an appearance of the apparatus for providing robot interaction services using an interactive behavior model according to an exemplary embodiment, and also showing sensors and function operating units thereof.

Referring to FIG. 3, the appearance of the apparatus for providing robot interaction services using an interactive behavior model according to an exemplary embodiment, and also sensors and function operating units at several locations thereof may be understood. First, as the function operating means, there are a head operating unit 300, a tail operating unit 310, a wheel operating unit 320, a head LED 330, a cheek LED 340, a camera 350, a sound generator 360, an LCD screen 370 and so on, which are at several locations of a robot. In addition, as the sensor means, there are a back touch sensor 301, an illumination sensor 302, a tilt sensor 303, a face touch sensor 304, a sound sensor 305, a body sensor 306, a distance sensor 307, an anti-falling sensor 308 and so on, which are at several locations of the robot. By using this configuration, various kinds of external circumstance observation information may be sensed, and various kinds of behaviors and functions of the robot may be performed.

FIG. 4 is a table exemplarily showing observation parameters of observation signals input to a control module employed in the apparatus for providing robot interaction services using an interactive behavior model according to an exemplary embodiment.

The observation signal input to the control module is defined in an observation parameter format. FIG. 4 shows various kinds of information which may be sensed by sensors, and parameters according to the information. For example, as shown in FIG. 4, seeing an input value of an observation parameter according to circumstances, the observation parameter has an input value of "1 2 2 2 1 2 2 2 2" when service history (orally narrated children's story) is high and a human is sensed by a thermal sensor in a state where a battery capacity is great. Here, it is assumed that a first value of each parameter is set to be 1, and a second value of the parameter is set to be 2. In other words, for each parameter in FIG. 4, "on", "null" and "low" are expressed with a value "1", and "off", "yes" and "high" are expressed with a value "2".

FIG. 5 is a table exemplarily showing behavior parameters of behavior signals output to the control module employed in the apparatus for providing robot interaction services using an interactive behavior model according to an exemplary embodiment.

As shown in FIG. 5, the behavior parameter according to a behavior signal output from the control module describes an emotion parameter or a behavior of a robot with a parameter name. For example, the behavior parameter includes "patted" meaning that the robot is patted, "pleased" meaning that the robot is pleased, "recomm" meaning that a service is recommended, "agree" meaning that the robot agrees, "sad" meaning that the robot is sad, and so on. The behavior parameter as above is mapped with an actual unit behavior of the robot by the motion generating unit 132 of the middleware module 130 so that a motion or function is performed by the robot function operating module 140.

Figure 6:
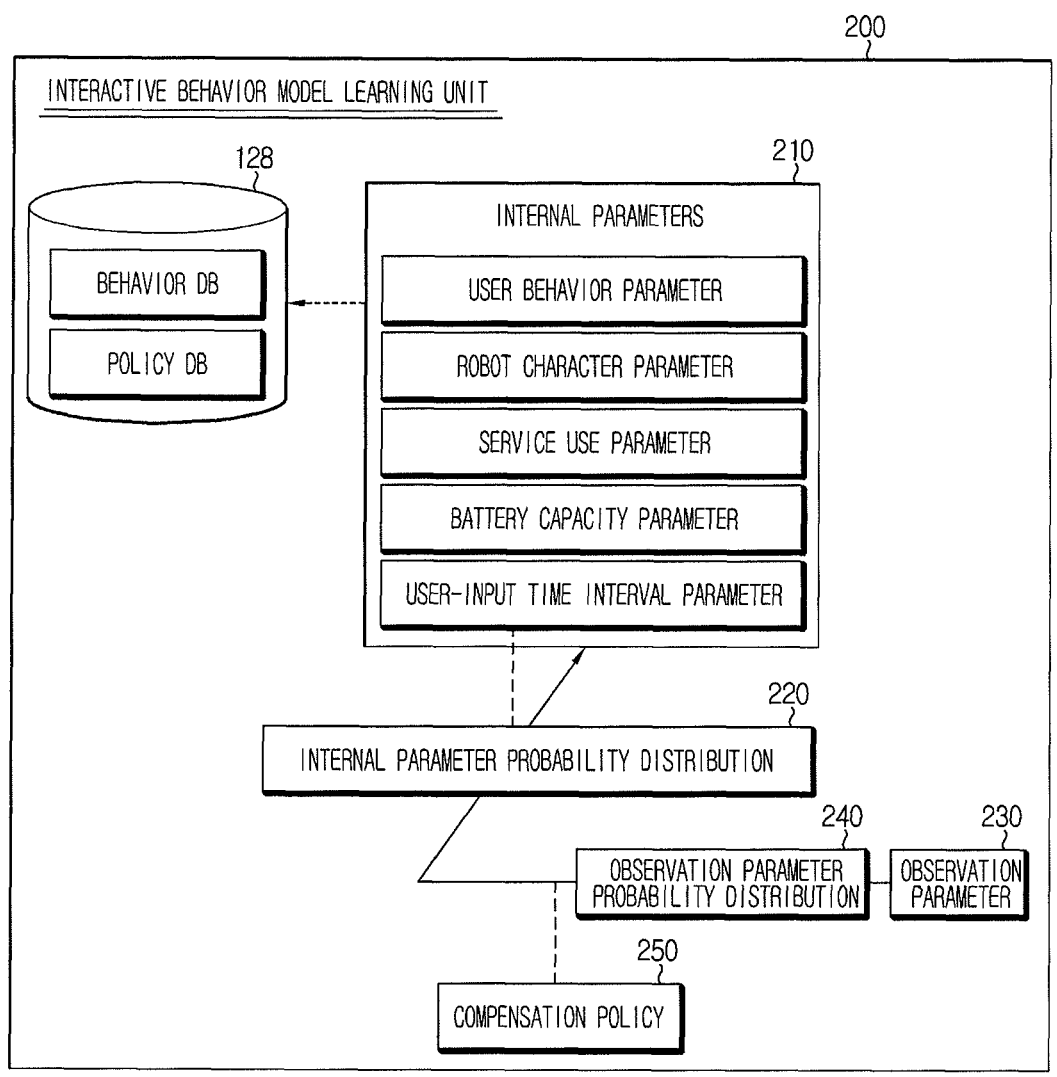
FIG. 6 is a block diagram showing an interactive behavior model learning unit employed in the apparatus for providing robot interaction services using an interactive behavior model according to an exemplary embodiment.

FIG. 6 is a block diagram showing an interactive behavior model learning unit employed in the apparatus for providing robot interaction services using an interactive behavior model according to an exemplary embodiment.

The interactive behavior model learning unit 200 according to the exemplary embodiment will be described with reference to FIG. 6. First, an observation parameter 230 is as defined in the observation parameter input by the observation signal input unit 124 of the control module 120, and the observation parameter 230 is mapped with an observation parameter probability distribution 240 which is a probability value in which a sensor error is considered. Here, behavior model internal parameters 210 for causing various kinds of robot behaviors according to circumstances are defined. The internal parameters 210 include a user behavior parameter, a robot character parameter, a service use parameter, a battery capacity parameter, a user-input time interval parameter and so on. In addition, an initial value of internal probability distribution 220 is applied to the internal parameters 210.

A learning method using the interactive behavior model learning unit 200 configured as above uses POMDP in order to extract an optimal robot behavior parameter from the observation parameter 230. In the learning process, the interactive behavior model learning unit 200 applies a positive or negative compensation policy 250 to a user behavior parameter and a robot character parameter, which are most suitable for the output robot behavior parameter, to optimize the probability distribution 220 of the internal parameter 210. The construction of the DB 128 is a result from the learning process of the interactive behavior model learning unit 200. The DB 128 constructed as above stores models in which a user input, an internal parameter, an output behavior parameter, and probability distributions considering various sensor errors are defined. In addition, the DB 128 stores the compensation policy 250 for deriving an optimal robot behavior according to the observation parameter 230 by using a scenario between the user and the robot.

The POMDP which is a statistical learning method used by the interactive behavior model learning unit 200 is an optimizing algorithm based on a symbolic Heuristic Search Value Iteration (HSVI). The symbolic HSVI preferentially, but not necessarily, seeks a belief point which is most helpful for decreasing an error generated when a parameter function is calculated, and a tree structure is applied thereto to use an algebraic method which utilizes Algebraic Decision Diagram (ADD).

In detail, in the learning process by the interactive behavior model learning unit 200 using the above algorithm, if an observation parameter is input, the interactive behavior model learning unit 200 defines the robot character according to familiarity and user behavior and the service use history as internal parameters, and sets an initial value of the probability of change of the internal parameters. When seeking optimal behavior and policy models, the interactive behavior model learning unit 200 finds a state of belief while preferentially, but not necessarily, searching a belief point and extracts a policy at this time. In addition, the policy expects an expected compensation, and the policy is optimized using a reinforced learning method. A series of the above processes are repeated during the learning process for optimization.

FIG. 7 is a table exemplarily showing internal parameters of the interactive behavior model learning unit employed in the apparatus for providing robot interaction services using an interactive behavior model according to an exemplary embodiment.

As shown in FIG. 7, the internal parameters of the interactive behavior model learning unit has user behavior parameters (user) such as "noexist" meaning that the user is not close, "close" meaning that the user is close, "up" meaning that the user lifts up the robot, "shake" meaning that the user shakes the robot, "shout" meaning that the user shouts, "accept" meaning that the user accepts a service, "reject" meaning that the user rejects a service, "nointer" meaning that the user makes no interaction, "charge" meaning that the user charges the robot, and so on; and robot behavior parameters (mong) classified into a very timid character (P11)→a little timid character (P22)→a little charming character (P33)→a very charming character (P44) according to the familiarity. The service history parameter (hist), the battery capacity parameter (battery) and the user-input time interval parameter (time) are expressed with 'low' and 'high'.

FIG. 8 is a block diagram for exemplarily illustrating a compensation policy of the interactive behavior model learning unit employed in the apparatus for providing robot interaction services using an interactive behavior model according to an exemplary embodiment.

As shown in FIG. 8, the compensation policy of the interactive behavior model learning unit is focused on changing the character of the robot in order to derive diverse robot behaviors suitable for circumstances according to the input of a user or the service use history. The character may be changed by a positive compensation ("close", "pat", "up", "accept") or a negative compensation ("shake", "reject", "nointer", "charge") according to the input of the user. The character is changed in the order of a very timid character (P11)→a little timid character (P22)→a little charming character (P33)→a very charming character (P44) as the composition becomes more positive. Meanwhile, as the compensation becomes more negative, the character is changed in reverse order.

Figure 9:
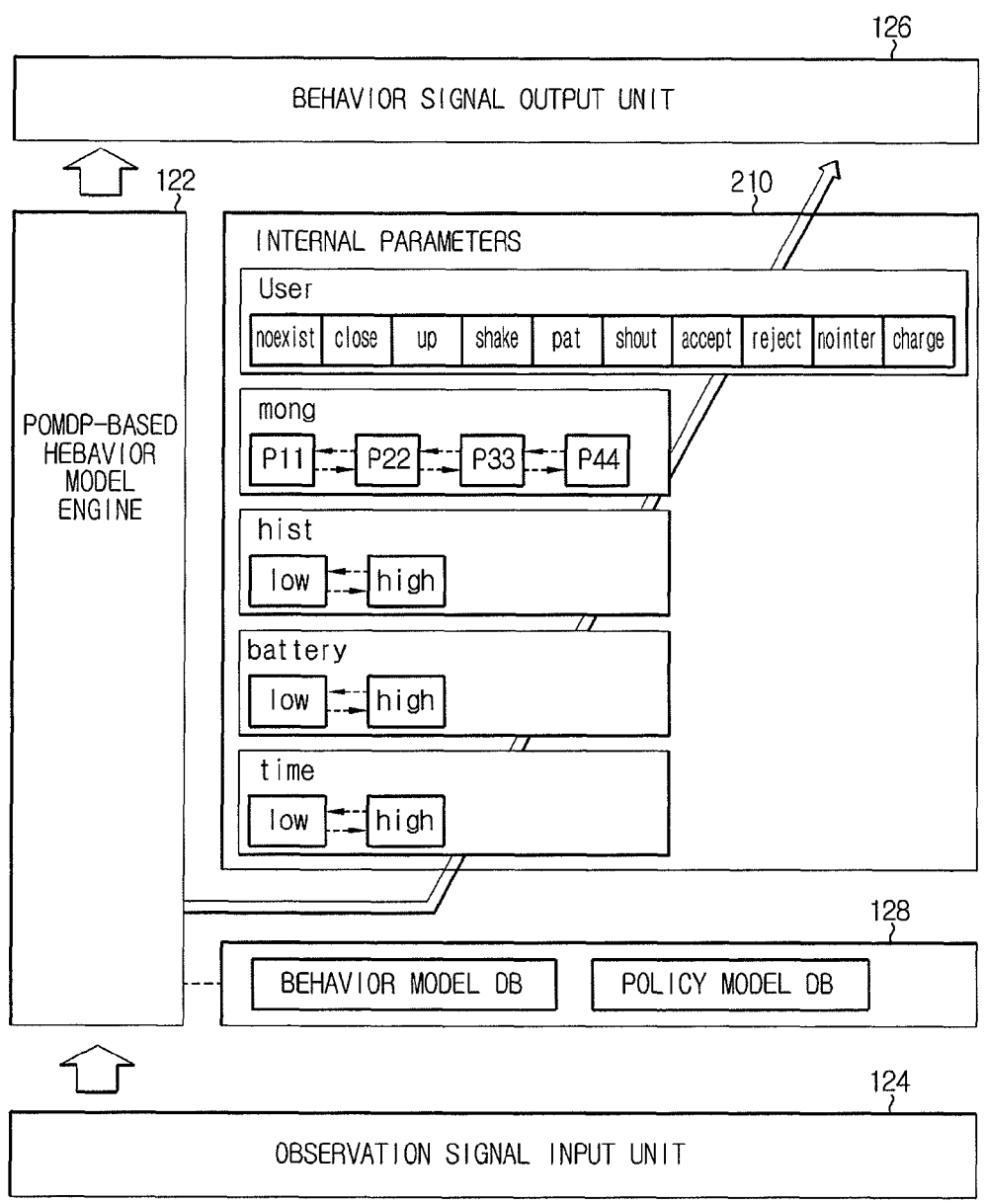
FIG. 9 is a block diagram showing a behavior model engine processing state of the control module employed in the apparatus for providing robot interaction services using an interactive behavior model according to an exemplary embodiment.

FIG. 9 is a block diagram showing a behavior model engine processing state of the control module employed in the apparatus for providing robot interaction services using an interactive behavior model according to an exemplary embodiment.

Referring to FIG. 9, by using the information stored in the DB 128 constructed as a result of the learning process of the interactive behavior model learning unit 200 by using the observation parameter input by the observation signal input unit 124, the behavior model engine 122 using the statistic inference method estimates a user parameter in the internal parameter 210, changes the character of the robot according to the character parameter, searches the service use history, the battery capacity history and the user-input time interval history to derive a robot behavior parameter optimized for the input observation parameter, and then outputs the behavior parameter as a behavior signal through the behavior signal output unit 126.

Figure 10:
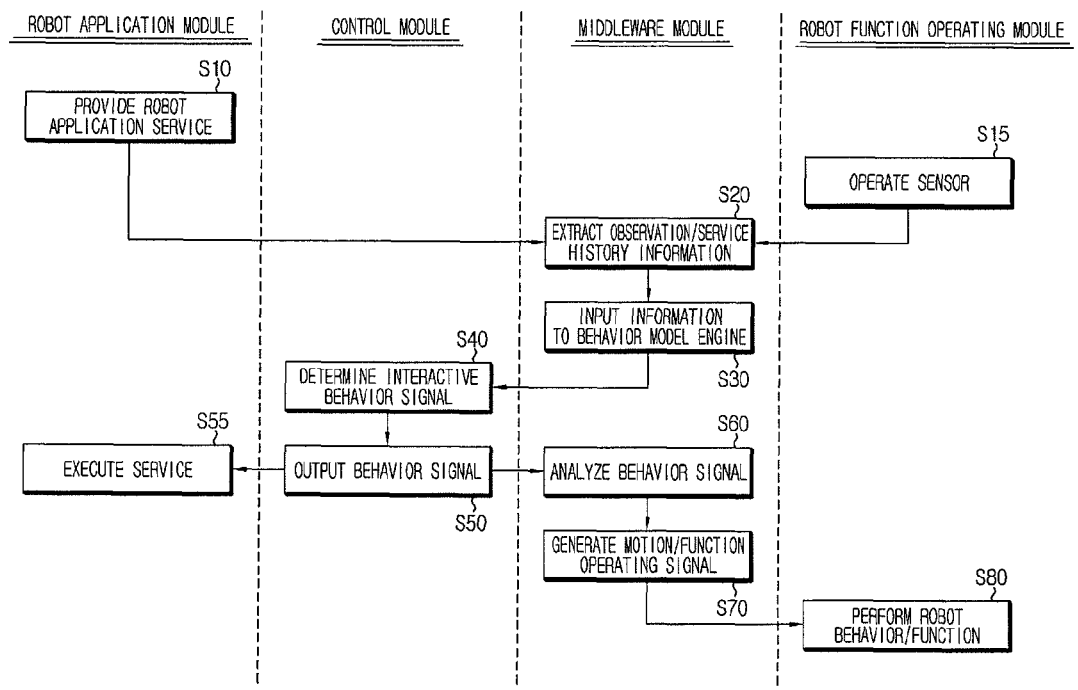
FIG. 10 is a flowchart for illustrating a method for providing robot interaction services using an interactive behavior model according to an exemplary embodiment.

FIG. 10 is a flowchart for illustrating a method for providing robot interaction services using an interactive behavior model according to an exemplary embodiment.

Referring to FIG. 10, a method for providing robot interaction services using an interactive behavior model according to the exemplary embodiment will be described.

First, the robot application module executes a robot application loaded thereto to provide a robot application service. At this time, an application selected by a user is executed. In addition, the selected application is executed when the user requests the provision of the service. Moreover, the robot application module may provide a service interactively according to a behavior signal of the robot output from the control module (S10).

The function operating module operates a plurality of sensors of the robot to successively sense surrounding states and circumstances (S15).

The middleware module extracts service use information and service history information for the service provided by the robot application module and extracts observation information of the surrounding states and circumstances sensed and measured by the function operating module (S20).

After that, the middleware module converts the extracted observation information and the extracted service history information and inputs the converted information to the behavior model engine of the control module. At this time, the observation information and the service history information are converted into observation parameters (S30).

The control module determines an interactive behavior signal based on the behavior and the policy model DBs according to the observation parameters input into the behavior model engine (S40). The principle of determining the behavior signal of the robot by the behavior model engine is already described.

The control module outputs the behavior signal, which is determined by the behavior model engine, as a behavior parameter (S50).

The robot application module applies the behavior signal output from the control module to execute a service so that a more interactive robot application service may be provided (S55).

In addition, the middleware module analyzes the behavior signal output from the control module (S60).

The middleware module generates motion operating signals and function operating signals for controlling the function operating module as a result of the analysis of the behavior signal (S70).

The function operating module forces the robot to perform a behavior or function based on the motion and function operating signals generated by the middleware module (S80).

In this way, when providing a robot application service to a user, the apparatus of the exemplary embodiments may give a robot interaction service by sensing the user and the surrounding circumstances and feeding back the sensed information to the robot behavior and the application service so that the robot may interact with the user.

The above-described exemplary embodiments can be performed by a processor and can also be embodied as computer readable codes which are stored on a computer readable recording medium (for example, non-transitory, or transitory) and executed by a computer or processor. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves such as data transmission through the Internet. The computer readable recording medium can also be distributed over network coupled computer systems so that the computer readable code is stored and executed in a distributed fashion. Also, functional programs, codes, and code segments for accomplishing the embodiments can be construed by programmers skilled in the art to which the disclosure pertains.

The present invention has been described in detail. However, it should be understood that the detailed description and specific examples, while indicating exemplary embodiments of the invention, are given by way of illustration only, since various changes and modifications within the spirit and scope of the invention will become apparent to those skilled in the art from this detailed description.

What is claimed is:
1. An apparatus for providing robot interaction services using an interactive behavior model between a user and a robot, the apparatus comprising:
a control module which comprises a behavior model engine which receives an observation signal from an outside and determines and outputs an interactive behavior signal based on behavior models and policy models, the behavior and the policy models being previously stored, according to the received observation signal;

a robot application module which executes a robot application service to be provided to the user and applies the interactive behavior signal output from the control module to provide the robot application service;

a robot function operating module which comprises a plurality of sensors which observes an external circumstance and a function operating unit for performing a behavior or a function of the robot; and a middleware module which extracts external circumstance observation information and service history information from the robot function operating module and the robot application module and inputs the external circumstance observation information and the service history information to the control module as the observation signal, analyzes the interactive behavior signal output from the control module to generate a motion operating signal and a function operating signal of the robot, and provides the generated motion operating signal and the function operating signal to the robot function operating module, wherein the control module includes a behavior model database (DB) and a policy model DB which respectively store the behavior models and the policy models constructed by an interactive behavior model learning unit using a statistical learning method, and wherein the behavior model DB stores models which respectively define an input of the user, an internal parameter, an output behavior parameter and a probability distribution which relates to an error of at least one of a plurality of sensors, so that a robot behavior signal is output with respect to the input of the user according to the external circumstance.

2. The apparatus for providing robot interaction services using the interactive behavior model according to claim 1, wherein the statistical learning method uses Partially Observable Markov Decision Process (POMDP).

3. The apparatus for providing robot interaction services using the interactive behavior model according to claim 2, wherein the interactive behavior model learning unit defines an observation parameter according to sensed observation information, input service history information, and an internal parameter according to the external circumstance, and a probability distribution value is applied to the observation parameter and the internal parameter.

4. The apparatus for providing robot interaction services using the interactive behavior model according to claim 3, wherein a positive compensation policy or a negative compensation policy is provided to apply a probability distribution value to the internal parameter, when the interactive behavior model learning unit is learning.

5. The apparatus for providing robot interaction services using the interactive behavior model according to claim 1, wherein the policy model DB stores a compensation policy for deriving a behavior of the robot with respect to an observed parameter in consideration of a scenario between the user and the robot.

6. The apparatus for providing robot interaction services using the interactive behavior model according to claim 1, wherein the middleware module comprises a motion generating unit which defines the behavior or function performed according to the behavior signal output from the control module, by using a motion operating signal and a function operating signal.

7. A method for providing robot interaction services using an interactive behavior model for interaction between a user and a robot, the method comprising:

executing an application loaded to a robot terminal to provide a robot application service to a user;

extracting service history information of the robot application service provided by the application and external circumstance observation information detected by a plurality of sensors through a middleware and inputting the service history information and the external circumstance observation information to an interactive behavior model engine;

determining and outputting by the interactive behavior model engine, an interactive behavior signal according to the service history information and the external circumstance observation information, based on behavior models and policy models, the behavior models and the policy models being constructed by an interactive behavior model learning unit using a statistical learning method, the behavior models being previously stored in a behavior model database, and the policy models being previously stored in a policy model database;

analyzing by the middleware, the output interactive behavior signal to generate a motion operating signal and a function operating signal of the robot; and performing by a robot function operating unit, a behavior or a function of the robot according to the generated motion operating signal and the generated function operating signal, wherein the behavior model database stores models which respectively define an input of the user, an internal parameter, an output behavior parameter and a probability distribution which relates to an error of at least one of a plurality of sensors, so that a robot behavior signal is output with respect to the input of the user according to the external circumstance observation information.

8. The method for providing robot interaction services using the interactive behavior model according to claim 7, further comprising:

providing the output interactive behavior signal to the application loaded to the robot terminal so that the output interactive behavior signal is applied for providing the robot application service.

9. The method for providing robot interaction services using the interactive behavior model according to claim 7, wherein the statistic learning method uses Partially Observable Markov Decision Process (POMDP).

10. An apparatus which provides robot interaction services using a model between a user and a robot, the apparatus comprising:

a control unit which comprises a behavior model engine which receives an external signal and outputs a behavior signal based on previously stored models and based on the external signal, the previously stored models including at least one behavior model and at least one policy model;

an application unit which applies the behavior signal to execute and provide the robot application service;

an operation unit comprising a sensor which detects an external event and an output unit which outputs a behavior or a function of the robot; and a middleware unit which receives external event observation information and service history information from the operation unit and the application unit and inputs the external event observation information and the service history information to the control unit as the external signal, analyzes the behavior signal to generate and provide a motion operating signal and a function operating signal to the operation unit, wherein at least one from among the control, the application, the operation, and the middleware units is performed by a processor, wherein the control module includes a behavior model database (DB) and a policy model DB which respectively store the at least one behavior model and the at least one policy model constructed by an interactive behavior model learning unit using a statistical learning method, and wherein the behavior model DB stores at least one model which respectively define an input of the user, an internal parameter, an output behavior parameter and a probability distribution which relates to an error of at least one of a plurality of sensors, so that a robot behavior signal is output with respect to the input of the user according to the detected external event.

11. The apparatus which provides robot interaction services according to claim 10, wherein the statistical learning is based on Partially Observable Markov Decision Process.

* * * * *